(12) United States Patent
Gopalakrishnan et al.

(10) Patent No.: US 11,457,470 B2
(45) Date of Patent: *Sep. 27, 2022

(54) RANDOM ACCESS TRIGGER FRAME BASED UPLINK OFDMA SCHEDULING MECHANISM

(71) Applicant: Cisco Technology, Inc., San Jose, CA (US)

(72) Inventors: Guru Prasanna Gopalakrishnan, San Jose, CA (US); David S. Kloper, Santa Clara, CA (US); Pooya Monajemi, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 17/036,724

(22) Filed: Sep. 29, 2020

(65) Prior Publication Data
US 2021/0014888 A1   Jan. 14, 2021

Related U.S. Application Data

(63) Continuation of application No. 16/420,663, filed on May 23, 2019, now Pat. No. 10,849,157.

(51) Int. Cl.
*H04W 74/00* (2009.01)
*H04W 74/08* (2009.01)
(Continued)

(52) U.S. Cl.
CPC ..... *H04W 74/004* (2013.01); *H04W 28/0278* (2013.01); *H04W 28/0289* (2013.01);
(Continued)

(58) Field of Classification Search
CPC ........... H04W 74/004; H04W 28/0278; H04W 28/0289; H04W 72/1268; H04W 74/085;
(Continued)

(56) References Cited

U.S. PATENT DOCUMENTS

2012/0164948 A1* 6/2012 Narasimha .............. H04L 1/188
455/63.1
2013/0235773 A1* 9/2013 Wang ................ H04W 52/0203
370/311
(Continued)

OTHER PUBLICATIONS

Leonardo Lanante Jr et al., "Performance Analysis of the 802.11ax UL OFDMA Random Access Protocol in Dense Networks", IEEE ICC 2017 Wireless Communications Symposium, https://ieeexplore.ieee.org/abstract/document/7997340, May 2017, 6 pages.
(Continued)

*Primary Examiner* — Eunsook Choi
(74) *Attorney, Agent, or Firm* — Edell, Shapiro & Finnan, LLC

(57) ABSTRACT

A method for scheduling a random access trigger frame (RA TF) in a wireless LAN includes determining whether a scheduled access (SA) TF is scheduled during a beacon interval (BI) beginning with a next beacon; determining whether one of, a first weighted average of a sum of (i) a number of clients whose respective buffer status reports (BSRs) have been successfully received ($N_{SUCC}$) and (ii) a number of clients whose respective BSRs collided with one another ($N_{COL}$) is greater than a first threshold, or a second weighted average of an active number of UL OFDMA enabled HE users sending SU uplink traffic ($N_{SU}$) is greater than the first threshold; when either weighted average is greater than the first threshold, allocating a predetermined number of RA RUs along with at least one SA RU in a buffer status report poll (BSRP) TF and scheduling the BSRP TF for transmission.

20 Claims, 6 Drawing Sheets

(51) Int. Cl.
  *H04W 72/12*    (2009.01)
  *H04W 28/02*    (2009.01)
  *H04L 5/00*     (2006.01)
(52) U.S. Cl.
  CPC ..... *H04W 72/1268* (2013.01); *H04W 74/085* (2013.01); *H04L 5/0007* (2013.01)
(58) Field of Classification Search
  CPC .. H04W 74/02; H04W 74/006; H04L 5/0007; H04L 5/0044; H04L 47/14
  See application file for complete search history.

(56) References Cited

U.S. PATENT DOCUMENTS

| | | | |
|---|---|---|---|
| 2014/0198642 A1* | 7/2014 | Barriac | H04W 74/08 370/230 |
| 2016/0007379 A1* | 1/2016 | Seok | H04W 74/085 370/338 |
| 2017/0201940 A1* | 7/2017 | Koratekere Honnappa | H04W 52/0232 |
| 2017/0367118 A1* | 12/2017 | Choi | H04W 84/12 |
| 2018/0139699 A1* | 5/2018 | Choi | H04W 48/02 |
| 2018/0262533 A1* | 9/2018 | McCaig | H04L 63/1408 |

OTHER PUBLICATIONS

Ahn, et al., "An Energy Efficient Multiuser Uplink Transmission Scheme in the Next Generation WLAN for Internet of Things", Research Article, International Journal of Distributed Sensor Networks, Jun. 2016, 10 pages.

* cited by examiner

RANDOM ACCESS TRIGGER FRAME BASED UPLINK OFDMA SCHEDULING MECHANISM

CROSS REFERENCE TO RELATED APPLICATION

This application is a continuation of U.S. application Ser. No. 16/420,663, filed May 23, 2019, the subject matter of which is incorporated herein by reference in its entirety.

TECHNICAL FIELD

The present disclosure relates to wireless local area networking, and specifically to a more efficient mechanism to schedule uplink (UL) orthogonal frequency-division multiple access (OFDMA) based random access trigger frames.

BACKGROUND

IEEE 802.11ax provides a random-access trigger frame (RA-TF) based uplink OFDMA transmission mechanism where an access point (AP) can mark selected resource units (RU) in a TF for random access. Since any of the associated users (i.e., clients, such as mobile devices) can transmit in any such selected random-access RU following the trigger frame, system performance may potentially decrease as the number of active and contending clients increases. Further, the periodicity of RA-TF scheduling may lead to resource usage inefficiencies as, e.g., excessive, polling of users for uplink traffic can result in wasting allocated uplink resources.

DESCRIPTION OF EXAMPLE EMBODIMENTS

Overview

Figure 1:
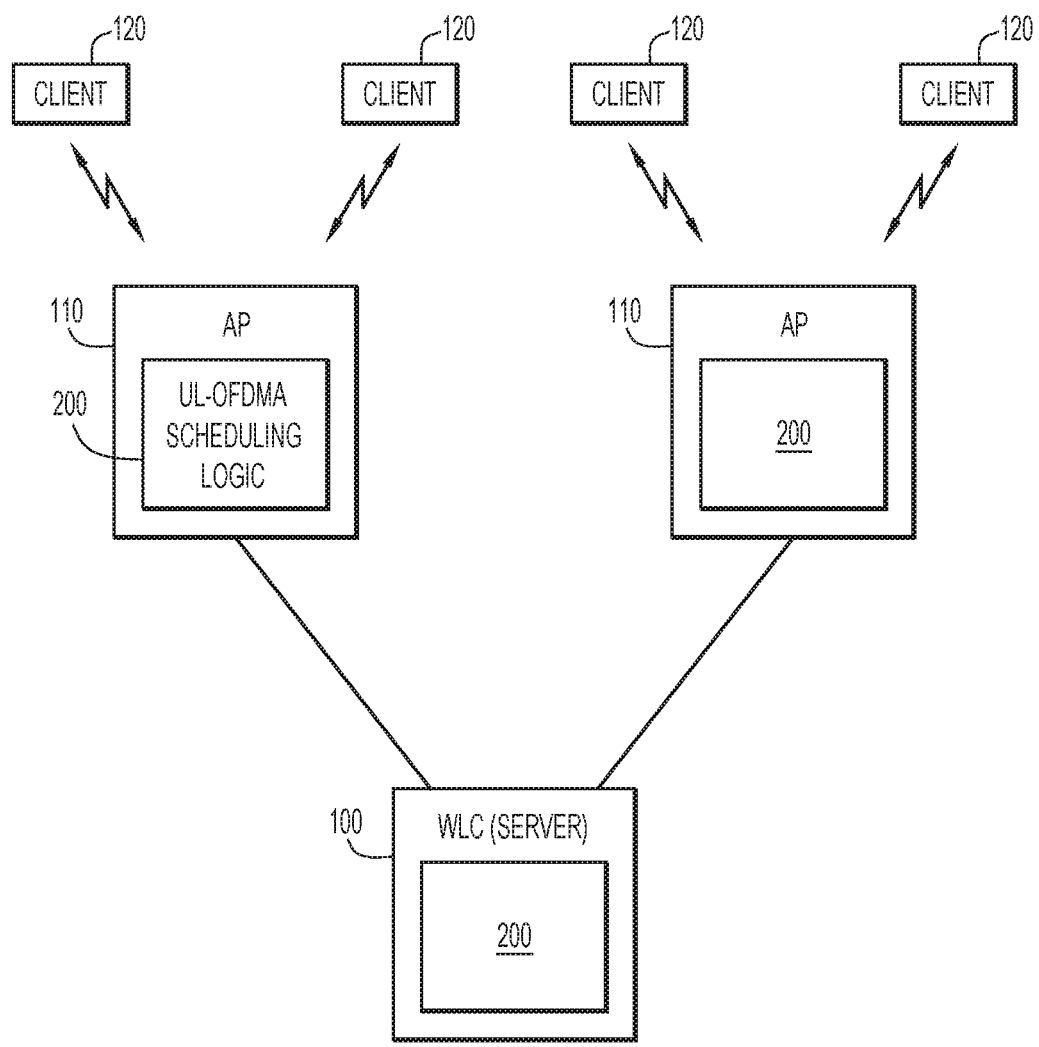
FIG. 1 depicts components of a network, including access points, mobile clients, a wireless LAN controller and UL-OFDMA scheduling logic in accordance with an example embodiment.

Presented herein are methodologies for efficiently scheduling a random access trigger frame (RA TF) in a wireless local area network (WLAN). A method according to an embodiment includes determining whether a next beacon to be sent by an access point in the WLAN includes a delivery traffic indication map (DTIM); when the next beacon to be sent by the access point does not include a DTIM, determining whether a scheduled access trigger frame (SA TF) is scheduled during a beacon interval (BI) beginning with the next beacon; when a SA TF is not scheduled during the BI beginning with the next beacon, determining whether, one of, a first weighted average of a sum of (i) a number of clients whose respective buffer status reports (BSRs) have been successfully received ($N_{SUCC}$) and (ii) a number of clients whose respective BSRs collided with one another ($N_{COL}$) is greater than a first threshold, or a second weighted average of active number of uplink (UL) orthogonal frequency-division multiple access (OFDMA) enabled high efficiency (HE) users sending single user (SU) uplink traffic ($N_{SU}$) is greater than the first threshold; and when either the first weighted average or the second weighted average is greater than the first threshold, allocating a predetermined number of random access resource units (RA RUs) along with at least one scheduled access resource unit (SA RU) in a buffer status report poll (BSRP) TF and scheduling the BSRP TF for transmission; and wirelessly transmitting the BSRP TF with the predetermined number of RA RUs and the at least one SA RU to clients in the wireless local area network A device or apparatus is also described. The device may include an interface unit configured to enable network communications, a memory, and one or more processors coupled to the interface unit and the memory, and configured to: determine whether a next beacon to be sent by an access point in a wireless local area network includes a delivery traffic indication map (DTIM); when the next beacon to be sent by the access point does not include a DTIM, determine whether a scheduled access trigger frame (SA TF) is scheduled during a beacon interval (BI) beginning with the next beacon; when a SA TF is not scheduled during the BI beginning with the next beacon, determine whether, one of, a first weighted average of a sum of (i) a number of clients whose respective buffer status reports (BSRs) have been successfully received ($N_{SUCC}$) and (ii) a number of clients whose respective BSRs collided with one another ($N_{COL}$) is greater than a first threshold, or a second weighted average of an active number of uplink (UL) orthogonal frequency-division multiple access (OFDMA) enabled high efficiency (HE) users sending single user (SU) uplink traffic ($N_{SU}$) is greater than the first threshold; and when either the first weighted average or the second weighted average is greater than the first threshold, allocate a predetermined number of random access resource units (RA RUs) along with at least one scheduled access resource unit (SA RU) in a buffer status report poll (BSRP) TF and schedule the BSRP TF for transmission; and wirelessly transmit the BSRP TF with the predetermined number of RA RUs and the at least one SA RU to clients in the wireless local area network.

Example Embodiments

The embodiments and approaches described herein provide a random-access trigger frame (RA-TF) based uplink OFDMA scheduling mechanism. As will be explained in more detail below, several approaches are taken into consideration to improve the scheduling efficiencies between clients and access points. Approaches include:

Optimizing RA-TF based UL-OFDMA transmission in a multi-BSS (basic service set) environment;

Implementing RA-TF scheduling logic that takes into account multiple parameters; and Updating RA-RUs allocation/UORA parameters.

Reference is first made to FIG. 1, which depicts components of a network, including access points, mobile clients, a wireless LAN controller and UL-OFDMA scheduling logic in accordance with an example embodiment. Specifically, wireless LAN controller (WLC) 100 controls a plurality of access points 110, which may respectively wirelessly serve a plurality of clients 120. A given client 120 may be a mobile device such as a smart phone, tablet, laptop, computer, Internet of Things (IoT) device, or any other electronic device configured to communicate wirelessly with an AP 110.

AP 110, although shown as a physical component (which might include multiple radios (each having its own basic service set (BSS) identifier (BSSID) and antennas, etc.), can also be considered as providing a network access function, which might be split between the physical components of the AP 110 and the WLC 100. Each AP 110, and/or WLC 100 may host all, or aspects of (in a distributed manner), UL-OFDMA scheduling logic 200, the function of which is described in detail below.

Figure 2:
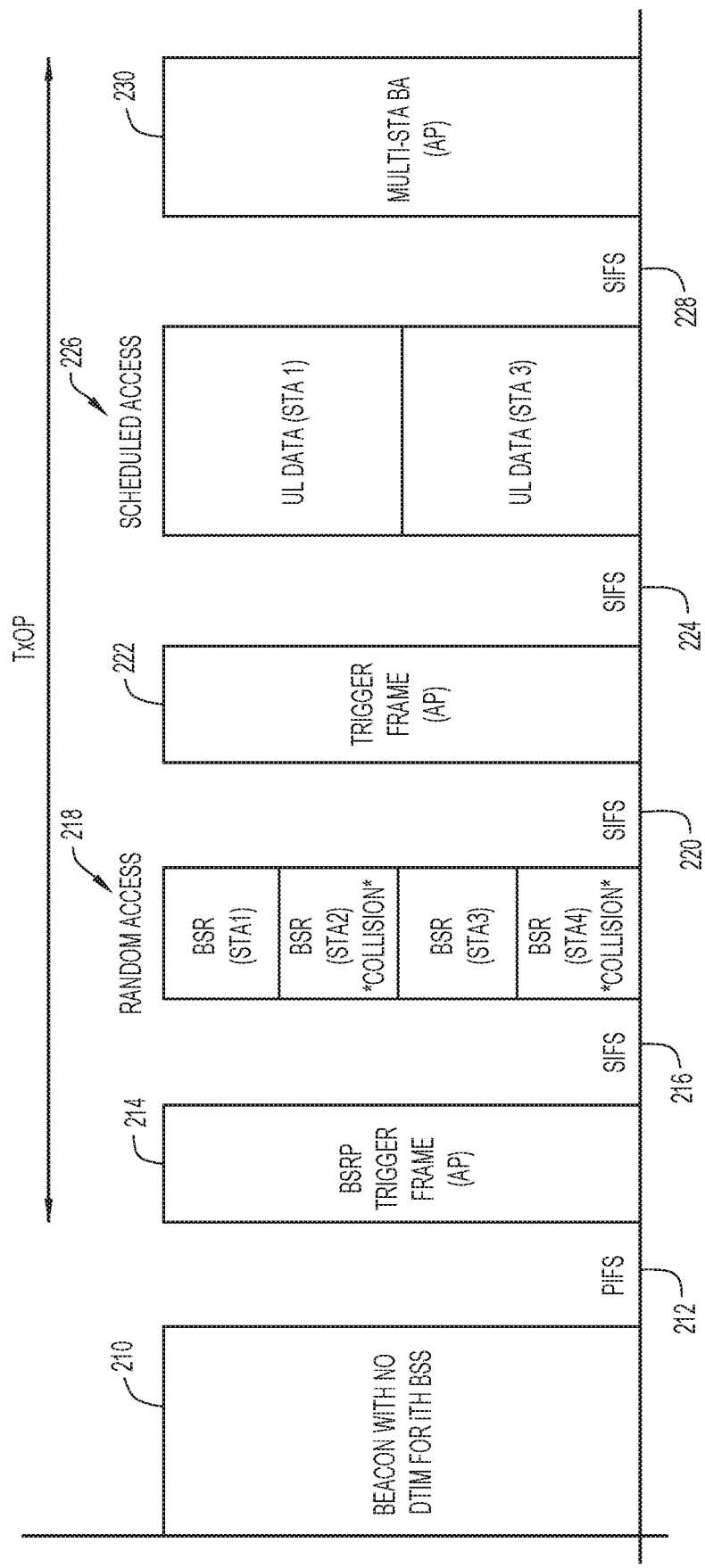
FIG. 2 depicts an UL-OFDMA transmission mechanism in accordance with an example embodiment.

FIG. 2 depicts an UL-OFDMA transmission mechanism in accordance with an example embodiment. Specifically, and in accordance, generally, with the IEEE 802.11ax standard, FIG. 2 depicts a series of transmissions (during a transmit opportunity (TxOP)) sent by either an AP 110 or a given client 120. A beacon with no delivery traffic indication map (DTIM) 210 for the ith BSS is sent by the AP 110. A point interframe space (PIFS) 212 is provided thereafter. A buffer status report poll (BSRP) trigger frame 214 is then sent by the AP 110. It is the scheduling of such a BSRP trigger frame 214 that is one focus of the instant embodiments. A short interframe space (SIFS) 216 is then provided. In response to the BSRP 214, multiple clients or stations (e.g., STA1, STA2, STA3, STA4) send, simultaneously, during a random access period, buffer status reports (BSRs) 218 indicating how much data each respective client 120 has to uplink to the AP 110. As indicated in the figure, the BSRs 218 of STA2 and STA4 collide with one another, and are therefore not correctly received by the AP 110. Another SIFS 220 is provided after the BSRs are sent.

A trigger frame 222 (indicating allocation of RUs for STA1 and STA2) is then transmitted by the AP 110. A SIFS 224 is provided after the trigger frame 222. Clients 120 (in this case, STA1 and STA2), in response to trigger frame 222, send uplink data during a scheduled access period 226. Another SIFS 228 is then provided, followed by a multi-station block acknowledgement (BA) 230 sent by the AP 110.

Thus, as indicated in FIG. 2, in the uplink OFDMA scheduling mechanism described herein, buffer status reports (BSRs) 218 are first collected from users in a random access (RA) trigger frame (TF) based uplink OFDMA transmission scheme followed by a scheduled access (SA) trigger frame based uplink OFDMA transmission scheme to gather actual uplink data based on the BSR collected. Several points are of interest in this context:

1) The BSRP RA-TF for $i^{th}$ BSS in a multi-BSS configuration on an AP 110 is scheduled PIFS time after transmitting $i^{th}$ BSS beacon with no DTIM. PIFS delay is employed to preempt contention based traffic from non-AP stations. Also, by transmitting a BSRP trigger frame right after the beacon transmission for a given BSS, the chances of overlapping with a beacon and subsequent power save related data transmissions in other active BSSs on the same radio may potentially be eliminated.

2) Scheduling BSRP RA-TF first has advantages. For example, the AP 110 will be aware of which clients have uplink data and their respective packet sizes which may then help in efficient RU allocation in the subsequent schedule access trigger frame (SA-TF) used to gather uplink data. Also, using the SA-TF, the AP can deterministically select stations which are better power synchronized for uplink data transmission thereby reducing considerably any inter-carrier interference due to timing mis-alignments between the selected stations.

3) The logic to decide when the above UL-OFDMA based scheduling mechanism should be used, and associated scheduling parameters, are discussed below.

RA-TF Scheduling Logic

In accordance with an embodiment, UL-OFDMA scheduling logic 200 determines when the RA-TF (i.e., the BSRP TF 214) of the UL-OFDMA based transmission mechanism of FIG. 2 is to be scheduled for a given BSS. Such an RA-TF is transmitted after a PIFS delay after a given beacon transmission, as shown in FIG. 2. UL-OFDMA scheduling logic 200 considers the following factors in connection with determining the timing of a RA-TF:

1) Estimated number of UL-OFDMA supported users (i.e., clients) with active uplink data for that BSS at a given time;

2) whether a DTIM is present or not in the upcoming beacon for that BSS;

3) Characterized uplink traffic from UL-OFDMA supported users for that BSS in the upcoming beacon interval (BI).

The number of uplink OFDMA supported users for a BSS with active uplink traffic at a given time is estimated using a suitable weighted average filter applied on the metrics enumerated below, computed from previous RA-BSRP TF transmissions along with a number of uplink OFDMA supported users sending single user (SU) uplink traffic ($N_{SU}$) in the recent beacon intervals in which RA-BSRP TF was not scheduled.

1) Number of users with successful BSR transmission in a random access-resource unit (RA-RU) ($N_{succ}$)

2) Number of colliding users—An approximation of the number of colliding users ($N_{col}$) can be obtained from detection and de-modulation of colliding OFDM signals 3) Number of unused RA-RUs ($N_{free}$)

In accordance with an UL-OFDMA based transmission mechanism embodiment, in beacon intervals where multicast or broadcast traffic is queued and scheduled for stations in power save mode (indicated by DTIM information element (IE) in beacon), a RA-TF is not scheduled. Further, if there is a necessity to schedule a SA-TF to collect uplink data from users with characterized traffic either by target wake time (TWT) (e.g., Internet of Things (IOT) devices) or machine learning (ML) based traffic classifiers, at some point later in a given BI, then usage of RA-TF right after the beacon is skipped for that BI to avoid redundant RA-TF scheduling. A more detailed explanation of the foregoing logic is described next in connection with FIGS. 3A and 3B.

Figure 3A:
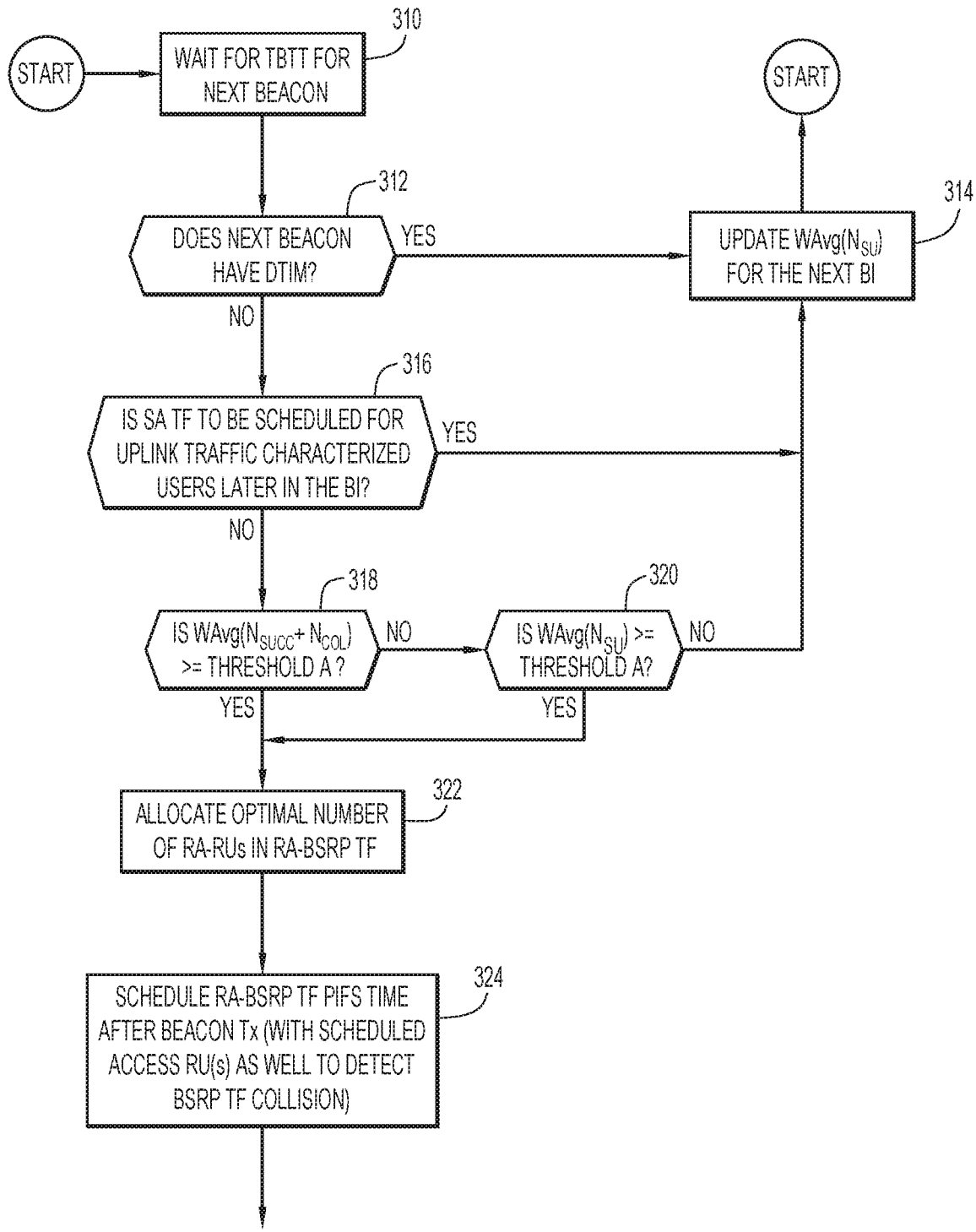
FIGS. 3A and 3B are flow charts depicting a series of operations performed by UL-OFDMA scheduling logic to schedule a RA-TF in accordance with an example embodiment.
Figure 3B:
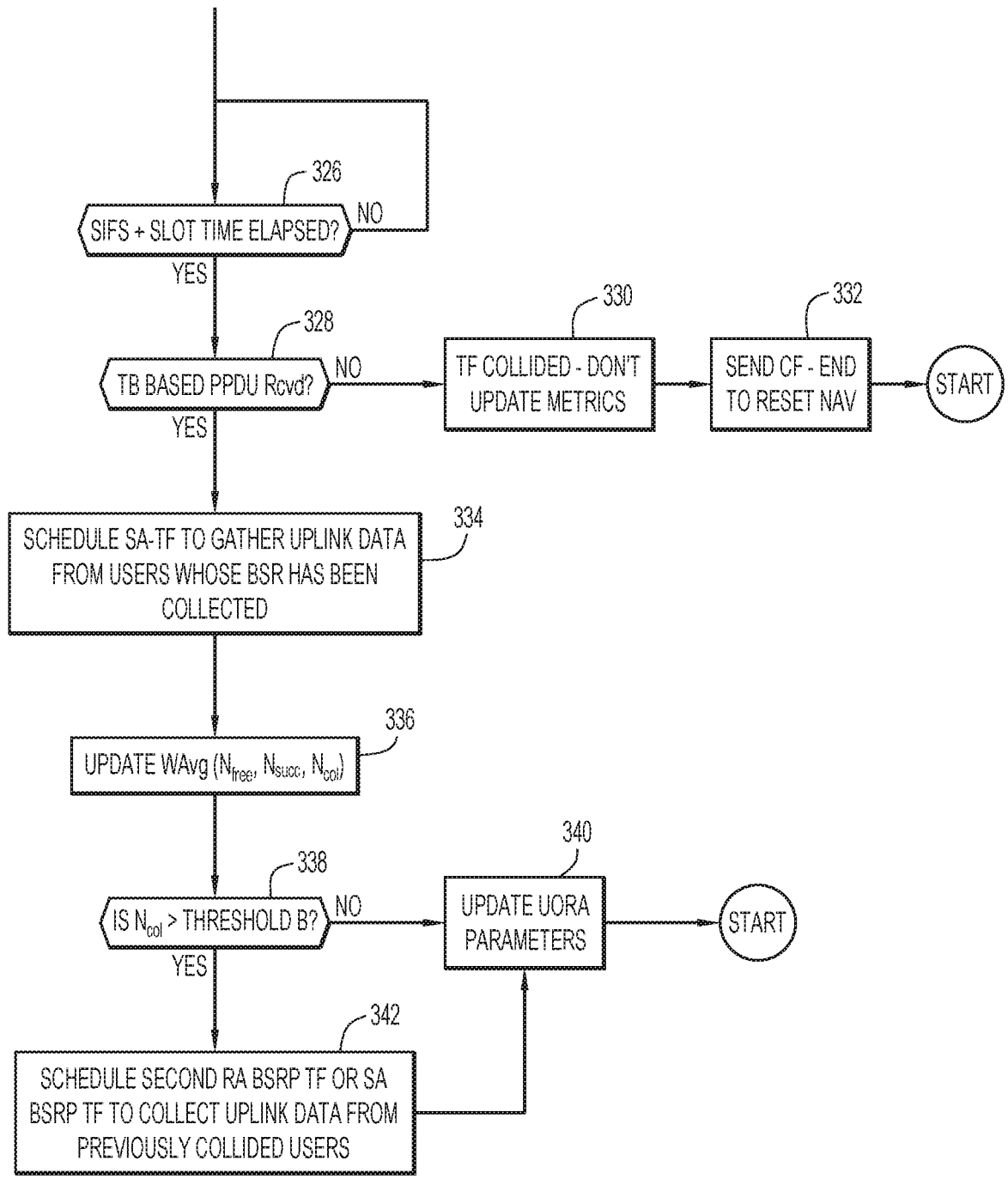

FIGS. 3A and 3B are flow charts depicting a series of operations performed by UL-OFDMA scheduling logic 200 to determine when to schedule an RA-TF in accordance with an example embodiment. As shown, operations begin at 310, at which UL-OFDMA scheduling logic 200 waits for a target beacon transmission time (TBTT) for a next beacon. At 312, it is determined whether the next beacon includes a DTIM. If the next beacon includes a DTIM, then, at 314, a weighted average of an active number of UL OFDMA enabled high efficiency (HE) users sending single (SU) uplink traffic (WAvg($N_{SU}$)) for the upcoming BI is updated, and the sequence returns to operation 310.

If, at 312, the next beacon does not include a DTIM, then, at 316, UL-OFDMA scheduling logic 200 determines whether a SA TF is scheduled for uplink traffic characterized users later in the beacon interval (BI). If a SA TF is scheduled for uplink traffic characterized users later in the BI, then the sequence continues with operation 314 at which the WAvg($N_{SU}$) is updated.

If, at 316, a SA TF is not scheduled for uplink traffic characterized users later in the BI, then UL-OFDMA scheduling logic 200, at 318, determines if a weighted average of successful client BSRs plus a number of BSRs subject to collision (WAvg($N_{succ}+N_{col}$)) is greater than a threshold A.

In accordance with an embodiment, threshold A may be calculated as follow:

$$ThresholdA \geq \frac{OH_{MU}}{OH_{SU}}$$

Where, $OH_{MU}$ (multi user overhead)=AIFS+BO+$T_{BSR\_TF}$+ SIFS+$T_{BSR}$+SIFS+$T_{TF}$+SIFS+$T_{MU\_Pream}$+SIFS+ $T_{MBA}$, $OH_{SU}$ (single user overhead)=AIFS+BO+$T_{SU\_Pream}$+ SIFS+$T_{BA}$, where
AIFS—Arbitration inter-frame spacing
BO—backoff interval
$T_{BSR\_TF}$—Avg. time taken to transmit RA-BSRP TF
$T_{BSR}$—Avg. time taken to transmit BSR by clients
$T_{TF}$—Avg. time taken to transmit basic TF
$T_{MU\_Pream}$—Avg. time taken to transmit high efficiency (HE) MU-OFDMA pre-amble
$T_{SU\_Pream}$—Avg. time taken to transmit HE SU pre-amble
$T_{MBA}$—Avg. time taken to transmit Multi-STA BA
$T_{BA}$—Avg. time taken to transmit BA If UL-OFDMA scheduling logic 200 determines that WAvg($N_{succ}+N_{col}$) is not greater than or equal to threshold A, then, at 320, UL-OFDMA scheduling logic 200 determines whether WAvg($N_{SU}$) is greater than or equal to threshold A. If, at 320, WAvg($N_{SU}$) is not greater than threshold A, then UL-OFDMA scheduling logic 200 returns to operation 314 at which WAvg($N_{SU}$) is updated for the upcoming BI.

If WAvg($N_{succ}+N_{col}$) is greater than or equal to threshold A at 318, or WAvg($N_{SU}$) is greater than or equal to threshold A at 320, then UL-OFDMA scheduling logic 200 proceeds to 322 at which an optimal number of RA-RUs in RA-BSRP TF is allocated. Optimal RA-RU allocation is discussed later herein.

Next, at 324, UL-OFDMA scheduling logic 200, schedules RA-BSRP TF PIFS time after a beacon transmission (with scheduled access RU(s) as well to detect BSRP TF collisions).

The operations then continue as depicted in FIG. 3B. At 326, UL-OFDMA scheduling logic 200 determines whether SIFS plus slot time has elapsed, i.e., UL-OFDMA scheduling logic 200 waits until that time has elapsed. After that time has elapsed, UL-OFDMA scheduling logic 200 determines, at 328, whether a trigger based (TB) Physical Layer Convergence Protocol (PLCP) Protocol Data Unit (PPDU) has been received. If not, this is indicative that the TF has collided (as indicated at 330), and thus metrics need not be updated at this point as this would result in incorrectly updating Nfree and Ncol. At 332, UL-OFDMA scheduling logic 200 sends a control frame (CF)-End to reset the network allocation vector (NAV). The process then returns to 310.

If, at 328, a TB based PPDU has been received, then UL-OFDMA scheduling logic 200, at 334, schedules a SA-TF to gather uplink data from respective clients whose BSR has been collected. Then, at 336, WAvg($N_{free}$, $N_{succ}$, $N_{col}$) is updated. At 338, UL-OFDMA scheduling logic 200 determines whether $N_{col}$ is greater than a threshold B, based on a number of active users (where threshold B, in an embodiment, equals $\beta*U_{Active}$, 0<=$\beta$<=1). If not, then, at 340, UL-OFDMA scheduling logic 200 updates UL OFDMA-based random access (UORA) parameters, if, e.g., the number of RA-RU collisions is consistently greater or lesser than collision threshold (threshold B) over a period of time, and the sequence returns to operation 310. If $N_{col}$ is less than threshold B at 338, then, at 342, UL-OFDMA scheduling logic 200 schedules a second RA BSRP TF or SA BSRP TF to collect uplink data from previously collided clients. The sequence then moves to 340, and then back to 310.

RA-RU Allocation/Updating UORA Parameters

The following are the parameters that may be considered by UL-OFDMA scheduling logic 200 for RU-Allocation/channel access when using RA TF based UL-OFDMA scheduling, according to an embodiment.

1) Optimal RA-RU Allocation
2) Updating UL-OFDMA based RA parameter set (UORA)
3) Scheduled access (SA) RU allocation in RA-BSRP TF
4) Threshold A, and threshold B (presented above)

Optimal RA-RU Allocation

The duration of BSR frame(s) transmitted by clients 120 depends on the size of RA RUs allocated in a BSRP TF which, in turn, is decided by the number of RA-RUs allocated in BSRP TF decided by the estimate of number of active UL OFDMA supported HE users with uplink traffic at a given time. In accordance with an embodiment, an assumption is made to use equal size for all allocated RA-RUs to collect BSRs.

For a period of a number of RA-BSRP trigger frames ($N_{TF}$), which is chosen as a function of size of a weighted average filter, M-average number of random access RUs in each RA-BSRP TF in that period and $U_{active}$ ($N_{succ}+N_{col}$) estimated active users with equal probability of selecting a RA-RU in that period, the following condition holds approximately as the maximum RU efficiency achieved is numerically equal to slotted ALOHA's maximum efficiency of 1/e≈37% for large number of users $$N_{TF} * \overline{M} \approx \frac{U_{active}}{0.37}$$

A size of the weighted average filter is selected as a function of UORA parameters and M—

$$\alpha * \left\lceil \frac{OCW_{min} + OCW_{max}}{2*M} \right\rceil$$

where OCWmin=minimum OFDMA contention window
OCWmax=maximum OFDMA contention window
OCWmin=2^EOCWmin−1 (where EOCW is an exponential value)
OCWmax=2^EOCWmax−1
alpha>0

RA-RU Allocation Algorithm for BSR Collection

```
Assume a = Index based on operating channel bandwidth BW;   // a => 0=26
tones, 1=52 tones, 2=106 tones, 3=242 tones, 4=484 tones, 5=996 tones, 6=2*996 tones
    while(a>=0 && !(Num_RU [a] >= M))
        RU_Size= -- a;
    end
    Num_RA_RU= Num_RU[a] - Num_Sched_RU;
```

Updating UL-OFDMA Based RA Parameter Set (UORA)

Assumptions:
EOCWmin in [Min_EOCWmin, Max_EOCWmin]
Max_EOCWmin<EOCWmax
N=function [Size of weighted average filter]
Algorithm:

```
If Ncol <= Collision_Threshold for the last N RA-BSRP TFs
        EOCWmin = max(EOCWmin - 1, Min_EOCWmin)
    else if Ncol > Collision_Threshold for the last N RA-BSRP TFs
        EOCWmin = min(EOCWmin + 1, Max_EOCWmin)
    else
        EOCWmin = EOCWmin
```

Scheduled Access (SA) RU Allocation in RA BSRP TF

To detect collisions with RA-BSRP TF transmission, and in accordance with an embodiment, at least one scheduled access RU is allocated in the BSRP TF along with rest of the RUs marked for random access. A fraction of the topmost active UL-MU-enabled users at a given time can be considered for scheduled access RUs allocation.

Figure 4:
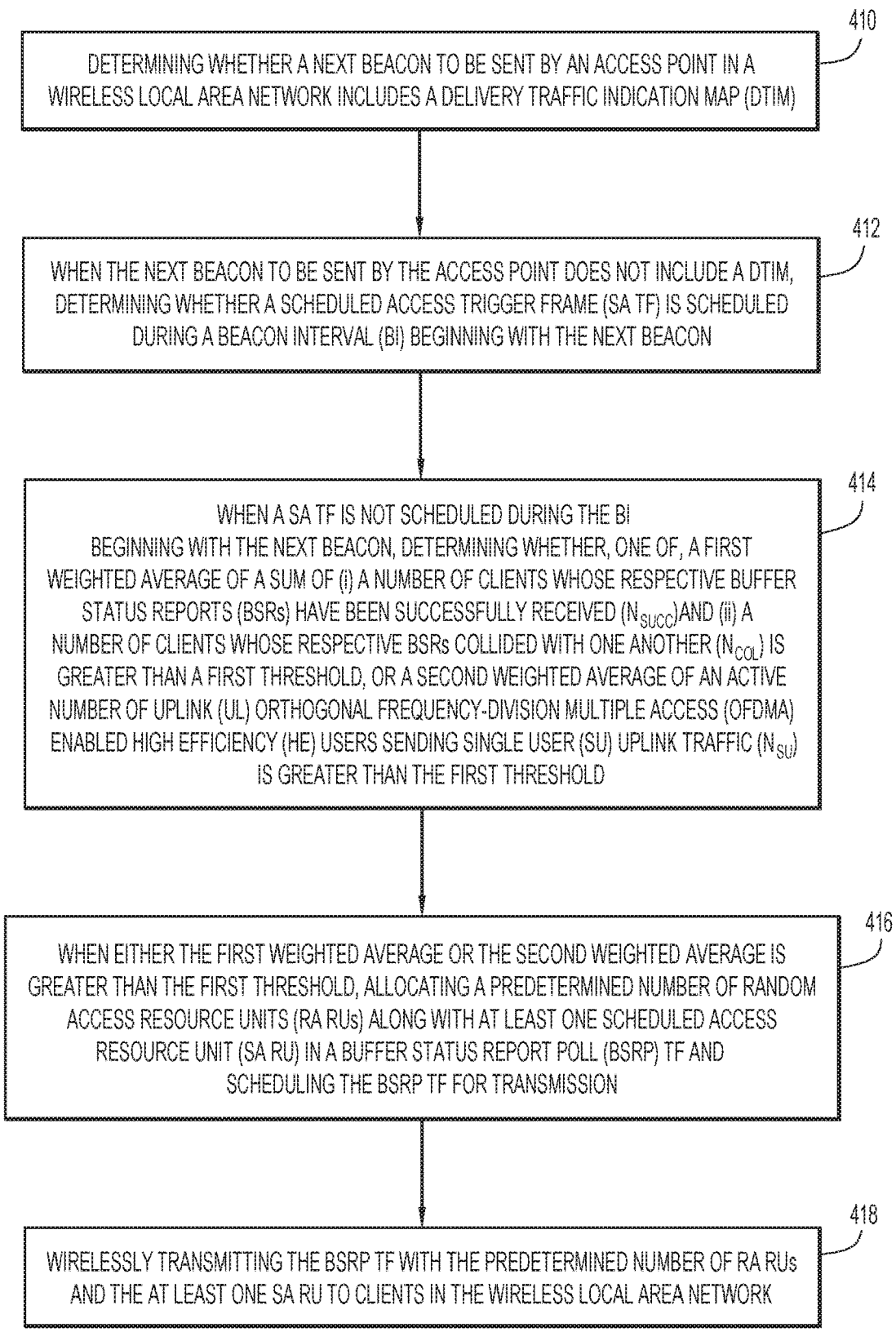
FIG. 4 is a flow chart depicting a series of operations performed by UL-OFDMA scheduling logic in accordance with another example embodiment.
Figure 5:
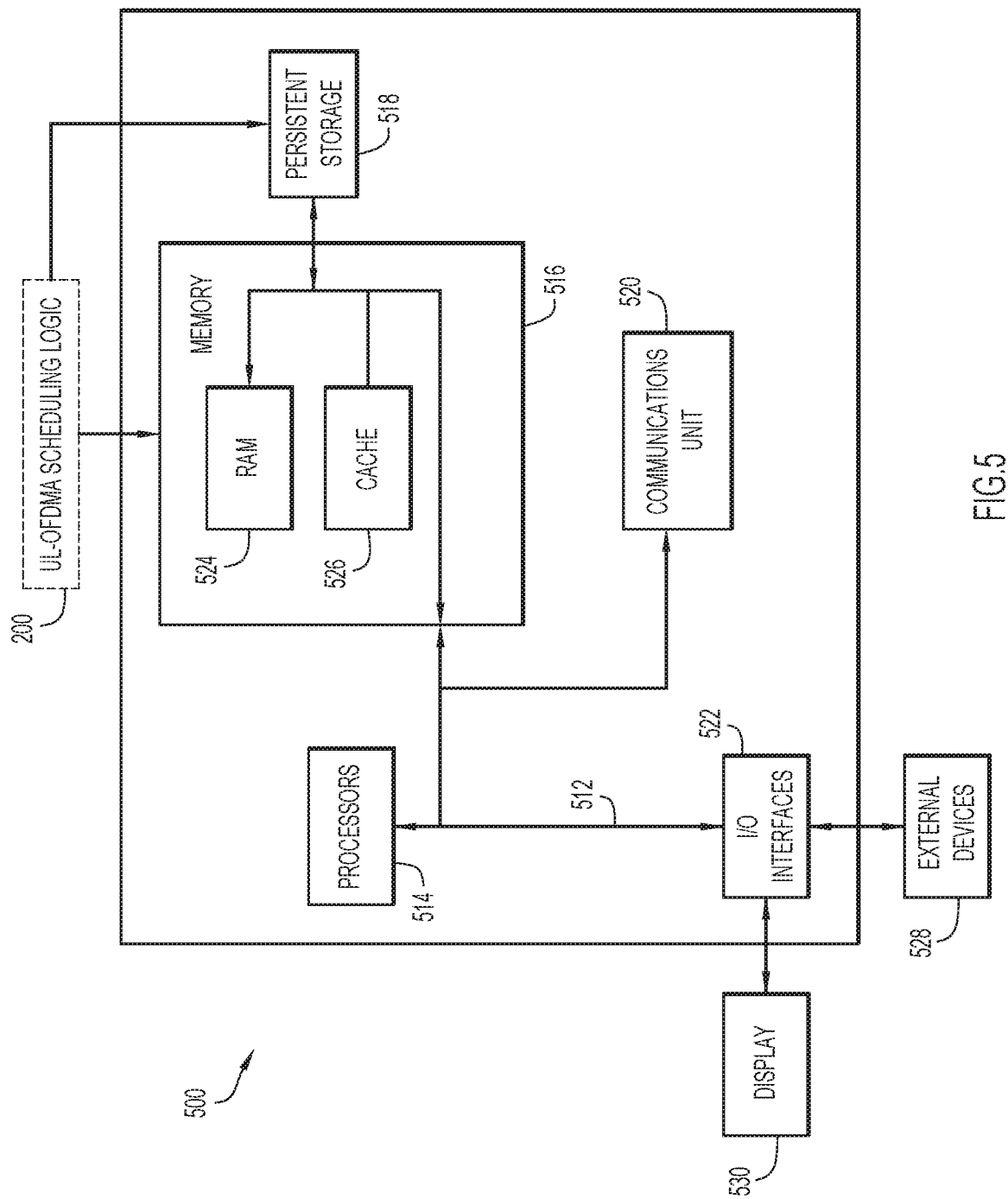
FIG. 5 depicts a device (e.g., a server or access point) that might host and execute UL-OFDMA scheduling logic in accordance with an example embodiment.

FIG. 4 is a flow chart depicting a series of operations performed by UL-OFDMA scheduling logic in accordance with another example embodiment. At 410, the logic is configured to determine whether a next beacon to be sent by an access point in a wireless local area network includes a delivery traffic indication map (DTIM). At 412, when the next beacon to be sent by the access point does not include a DTIM, the logic is configured to determine whether a scheduled access trigger frame (SA TF) is scheduled during a beacon interval (BI) beginning with the next beacon. At 414, when a SA TF is not scheduled during the BI beginning with the next beacon, the logic is configured to determine whether a first weighted average of a sum of (i) a number of clients whose respective buffer status reports (BSRs) have been successfully received ($N_{SUCC}$) and (ii) a number of clients whose respective BSRs collided with one another ($N_{COL}$) is greater than a first threshold, or a second weighted average of an active number of UL OFDMA enabled HE users sending SU uplink traffic ($N_{SU}$) is greater than the first threshold. At 416, when either the first weighted average or the second weighted average is greater than the first threshold, the logic is configured to allocate a predetermined number of random access resource units (RA RUs) along with at least one scheduled access resource unit (SA RU) in a buffer status report poll (BSRP) TF and schedule the BSRP TF for transmission. And, at 418, the logic is configured to wirelessly transmit the BSRP TF with the predetermined number of RA RUs and the at least one SA RU to clients in the wireless local area network FIG. 5 depicts a device (e.g., a server or access point) that might host and execute UL-OFDMA scheduling logic 200 (e.g., FIGS. 3A, 3B and or 4) in accordance with an example embodiment. It should be appreciated that FIG. 5 provides only an illustration of one embodiment and does not imply any limitations with regard to the environments in which different embodiments may be implemented. Many modifications to the depicted environment may be made.

As depicted, the device 500 includes a bus 512, which provides communications between computer processor(s) 514, memory 516, persistent storage 518, communications unit 520, and input/output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media. In the depicted embodiment, memory 516 includes random access memory (RAM) 524 and cache memory 526. In general, memory 516 can include any suitable volatile or non-volatile computer readable storage media.

One or more programs (e.g., UL-OFDMA scheduling logic 200) may be stored in persistent storage 518 for execution by one or more of the respective computer processors 514 via one or more memories of memory 516. The persistent storage 518 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information. For example, the one or more programs may include software instructions that, when executed by the one or more processors 414, cause the computing device 500 to perform the operations of, e.g., FIGS. 3A, 3B and/or 4.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems or devices. In these examples, communications unit 520 includes one or more network interface cards. Communications unit 520 may provide communications through the use of either or both physical and wireless communications links.

I/O interface(s) 522 allows for input and output of data with other devices that may be connected to computer device 500. For example, I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). The database system may be included within or coupled to the server and/or client systems. The database systems and/or storage structures may be remote from or local to the computer or other processing systems, and may store any desired data (e.g., data relating to contact center interaction routing).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided. The method includes determining whether a next beacon to be sent by an access point in a wireless local area network includes a delivery traffic indication map (DTIM); when the next beacon to be sent by the access point does not include a DTIM, determining whether a scheduled access trigger frame (SA TF) is scheduled during a beacon interval (BI) beginning with the next beacon; when a SA TF is not scheduled during the BI beginning with the next beacon, determining whether, one of, a first weighted average of a sum of (i) a number of clients whose respective buffer status reports (BSRs) have been successfully received ($N_{SUCC}$) and (ii) a number of clients whose respective BSRs collided with one another ($N_{COL}$) is greater than a first threshold, or a second weighted average of an active number of uplink (UL)

orthogonal frequency-division multiple access (OFDMA) enabled high efficiency (HE) users sending SU uplink traffic ($N_{SU}$) is greater than the first threshold; when either the first weighted average or the second weighted average is greater than the first threshold, allocating a predetermined number of random access resource units (RA RUs) along with at least one scheduled access resource unit (SA RU) in a buffer status report poll (BSRP) TF and scheduling the BSRP TF for transmission; and wirelessly transmitting the BSRP TF with the predetermined number of RA RUs and the at least one SA RU to clients in the wireless local area network.

In an embodiment, the first threshold is greater than or equal to a ratio of overhead apportioned to multi-user clients ($OH_{MU}$) and single-user clients ($OH_{SU}$).

In one embodiment, the overhead apportioned to multi-user clients comprises: $AIFS+BO+T_{BSR-TF}+SIFS+T_{BSR}+SIFS+T_{TF}+SIFS+T_{MU\_Pream}+SIFS+T_{MBA}$, where, AIFS is Arbitration inter-frame spacing, BO is backoff interval, $T_{BSR-TF}$ is Avg. time taken to transmit RA-BSRP TF, SIFS is short interframe space, $T_{BSR}$ is Avg. time taken to transmit BSR by clients, $T_{TF}$ is Avg. time taken to transmit basic TF, $T_{MU\_Pream}$ is Avg. time taken to transmit high efficiency (HE) MU-OFDMA pre-amble, and $T_{MBA}$ is Avg. time taken to transmit multi station block acknowledgment (Multi-STA BA).

In another embodiment, the overhead apportioned to single-user clients comprises: $AIFS+BO+T_{SU\_Pream}+SIFS+T_{BA}$, where, AIFS is Arbitration inter-frame spacing, BO is backoff interval, $T_{SU\_Pream}$ is Avg. time taken to transmit high efficiency singer user (HE SU) pre-amble, SIFS is short interframe space, and $T_{BA}$ is Avg. time taken to transmit BA.

In still another embodiment, the method includes confirming that a response to the BSRP TF, in the form of a BSR, has been received, and in response to confirming that a response to the BSRP TF has been received, scheduling a scheduled access TF (SA TF) to gather uplink data from clients in the wireless local area network.

In an embodiment, the at least one SA RU in the buffer status report poll (BSRP) TF is used to detect collisions with a RA BSRP TF transmission.

The method may still further include determining whether a number of clients whose respective BSRs collided with one another ($N_{COL}$) is greater than a second threshold, and when $N_{COL}$ is greater than the second threshold, scheduling another BSRP TF to collect uplink data from previously collided users.

In an embodiment, the second threshold is a function of a number of active users.

The method may still further include updating UL OFDMA-based random access (UORA) parameters scheduling the BSRP TF for transmission.

In an embodiment, at least one of the UORA parameters comprises a size of an OFDMA contention window (OCW).

In another form, a device may also be provided in accordance with an embodiment. The device may include an interface unit configured to enable network communications; a memory; and one or more processors coupled to the interface unit and the memory, and configured to: determine whether a next beacon to be sent by an access point in a wireless local area network includes a delivery traffic indication map (DTIM); when the next beacon to be sent by the access point does not include a DTIM, determine whether a scheduled access trigger frame (SA TF) is scheduled during a beacon interval (BI) beginning with the next beacon; when a SA TF is not scheduled during the BI beginning with the next beacon, determine whether, one of, a first weighted average of a sum of (i) a number of clients whose respective buffer status reports (BSRs) have been successfully received ($N_{SUCC}$) and (ii) a number of clients whose respective BSRs collided with one another ($N_{COL}$) is greater than a first threshold, or a second weighted average of an active number of uplink (UL) orthogonal frequency-division multiple access (OFDMA) enabled high efficiency (HE) users sending single user (SU) uplink traffic ($N_{SU}$) is greater than the first threshold; when either the first weighted average or the second weighted average is greater than the first threshold, allocate a predetermined number of random access resource units (RA RUs) along with at least one scheduled access resource unit (SA RU) in a buffer status report poll (BSRP) TF and schedule the BSRP TF for transmission; and wirelessly transmit the BSRP TF with the predetermined number of RA RUs and the at least one SA RU to clients in the wireless local area network.

In an embodiment, the first threshold is greater than or equal to a ratio of overhead apportioned to multi-user clients ($OH_{MU}$) and single-user clients ($OH_{SU}$).

In an embodiment, the overhead apportioned to multi-user clients comprises: $AIFS+BO+T_{BSR-TF}+SIFS+T_{BSR}+SIFS+T_{TF}+SIFS+T_{MU\_Pream}+SIFS+T_{MBA}$, where, AIFS is Arbitration inter-frame spacing, BO is backoff interval, $T_{BSR-TF}$ is Avg. time taken to transmit RA-BSRP TF, SIFS is short interframe space, $T_{BSR}$ is Avg. time taken to transmit BSR by clients, $T_{TF}$ is Avg. time taken to transmit basic TF, $T_{MU\_Pream}$ is Avg. time taken to transmit high efficiency (HE) MU-OFDMA pre-amble, and $T_{MBA}$ is Avg. time taken to transmit multi station block acknowledgment (Multi-STA BA).

In an embodiment the overhead apportioned to single-user clients comprises: $AIFS+BO+T_{SU\_Pream}+SIFS+T_{BA}$, where, AIFS is Arbitration inter-frame spacing, BO is backoff interval, $T_{SU\_Pream}$ is Avg. time taken to transmit high efficiency singer user (HE SU) pre-amble, SIFS is short interframe space, and $T_{BA}$ is Avg. time taken to transmit BA.

In an embodiment the one or more processors may be configured to confirm that a response to the BSRP TF, in the form of a BSR, has been received, and in response to confirming that a response to the BSRP TF has been received, schedule a scheduled access TF (SA TF) to gather uplink data from clients in the wireless local area network.

In an embodiment, the at-least one SA RU in the buffer status report poll (BSRP) TF may be used to detect collisions with a RA BSRP TF transmission In an embodiment the one or more processors may be configured to determine whether a number of clients whose respective BSRs collided with one another ($N_{COL}$) is greater than a second threshold, and when $N_{COL}$ is greater than the second threshold, schedule one of another BSRP TF to collect uplink data from previously collided users.

In still another form, a non-transitory computer readable storage media is provided that is encoded with instructions that, when executed by a processor, cause the processor to determine whether a next beacon to be sent by an access point in a wireless local area network includes a delivery traffic indication map (DTIM); when the next beacon to be sent by the access point does not include a DTIM, determine whether a scheduled access trigger frame (SA TF) is scheduled during a beacon interval (BI) beginning with the next beacon; when a SA TF is not scheduled during the BI beginning with the next beacon, determine whether, one of, a first weighted average of a sum of (i) a number of clients whose respective buffer status reports (BSRs) have been successfully received ($N_{SUCC}$) and (ii) a number of clients whose respective BSRs collided with one another ($N_{COL}$) is greater than a first threshold, or a second weighted average of an active number of uplink (UL) orthogonal frequency-division multiple access (OFDMA) enabled high efficiency (HE) users sending single user (SU) uplink traffic ($N_{SU}$) is greater than the first threshold; and when the weighted average is greater than the threshold, allocate a predetermined number of random access resource units (RA RUs) along with at least one scheduled access resource unit (SA RU) in a buffer status report poll (BSRP) TF and schedule the BSRP TF for transmission; and wirelessly transmit the BSRP TF with the predetermined number of RA RUs and the at least one SA RU to clients in the wireless local area network.

In an embodiment, the first threshold is greater than or equal to a ratio of overhead apportioned to multi-user clients ($OH_{MU}$) and single-user clients ($OH_{SU}$).

In an embodiment, the overhead apportioned to multi-user clients comprises: AIFS+BO+$T_{BSR-TF}$+SIFS+$T_{BSR}$+SIFS+$T_{TF}$+SIFS+$T_{MU-Pream}$+SIFS+$T_{MBA}$, where, AIFS is Arbitration inter-frame spacing, BO is backoff interval, $T_{BSR-TF}$ is Avg. time taken to transmit RA-BSRP TF, SIFS is short interframe space, $T_{BSR}$ is Avg. time taken to transmit BSR by clients, $T_{TF}$ is Avg. time taken to transmit basic TF, $T_{MU\_Pream}$ is Avg. time taken to transmit high efficiency (HE) MU-OFDMA pre-amble, and $T_{MBA}$ is Avg. time taken to transmit multi station block acknowledgment (Multi-STA BA).

The above description is intended by way of example only. Various modifications and structural changes may be made therein without departing from the scope of the concepts described herein and within the scope and range of equivalents of the claims.

What is claimed is:

1. A method comprising:
    determining whether a next beacon to be sent by an access point in a wireless local area network includes a delivery traffic indication map;
    when the next beacon to be sent by the access point does not include a delivery traffic indication map, determining whether a scheduled access trigger frame is scheduled during a beacon interval beginning with the next beacon;
    when a scheduled access trigger frame is not scheduled during the beacon interval beginning with the next beacon, determining whether, one of, a first weighted average calculated as a function of buffer status reports is greater than a first threshold, or a second weighted average calculated as a function of users sending single user uplink traffic is greater than the first threshold;
    when either the first weighted average or the second weighted average is greater than the first threshold, allocating a predetermined number of random access resource units along with at least one scheduled access resource unit in a buffer status report poll trigger frame and scheduling the buffer status report poll trigger frame for transmission; and
    wirelessly transmitting the buffer status report poll trigger frame with the predetermined number of random access resource units and the at least one scheduled access resource unit to clients in the wireless local area network.

2. The method of claim 1, wherein the first threshold is greater than or equal to a ratio of overhead apportioned to multi-user clients and single-user clients.

3. The method of claim 2, wherein the overhead apportioned to multi-user clients comprises: AIFS+BO+$T_{BSR-TF}$+SIFS+$T_{BSR}$+SIFS+$T_{TF}$+SIFS+$T_{MU\_Pream}$+SIFS+$T_{MBA}$, where,
    AIFS is Arbitration inter-frame spacing,
    BO is backoff interval,
    $T_{BSR-TF}$ is Avg. time taken to transmit a random access buffer status report poll trigger frame,
    SIFS is short interframe space,
    $T_{BSR}$ is Avg. time taken to transmit buffer status report by clients,
    $T_{TF}$ is Avg. time taken to transmit basic TF,
    $T_{MU\_Pream}$ is Avg. time taken to transmit high efficiency (HE) MU-OFDMA preamble, and
    $T_{MBA}$ is Avg. time taken to transmit multi station block acknowledgment (Multi-STA BA).

4. The method of claim 2, wherein the overhead apportioned to single-user clients comprises: AIFS+BO+$T_{SU\_Pream}$+SIFS+$T_{BA}$,
    where,
    AIFS is Arbitration inter-frame spacing,
    BO is backoff interval,
    $T_{SU\_Pream}$ is Avg. time taken to transmit high efficiency singer user (HE SU) preamble,
    SIFS is short interframe space, and
    $T_{BA}$ is Avg. time taken to transmit BA.

5. The method of claim 1, further comprising confirming that a response to the buffer status report poll trigger frame, in a form of a buffer status report, has been received, and in response to confirming that a response to the buffer status report poll trigger frame has been received, scheduling a scheduled access trigger frame to gather uplink data from clients in the wireless local area network.

6. The method of claim 1, wherein the at least one scheduled access resource unit in the buffer status report poll trigger frame is used to detect collisions with a random buffer status report poll trigger frame transmission.

7. The method of claim 1, further comprising determining whether a number of clients whose respective buffer status reports collided with one another ($N_{COL}$) is greater than a second threshold, and when $N_{COL}$ is greater than the second threshold, scheduling another buffer status report poll trigger frame to collect uplink data from previously collided users.

8. The method of claim 7, wherein the second threshold is a function of a number of active users.

9. The method of claim 1, further comprising updating uplink orthogonal frequency-division multiple access-based random access parameters scheduling the buffer status report poll trigger frame for transmission.

10. The method of claim 9, wherein at least one of the uplink orthogonal frequency-division multiple access-based random access parameters comprises a size of an orthogonal frequency-division multiple access random access contention window (OCW).

11. A device comprising:
    an interface unit configured to enable network communications;
    a memory; and
    one or more processors coupled to the interface unit and the memory, and configured to:
        determine whether a next beacon to be sent by an access point in a wireless local area network includes a delivery traffic indication map;
        when the next beacon to be sent by the access point does not include a delivery traffic indication map, determine whether a scheduled access trigger frame is scheduled during a beacon interval beginning with the next beacon;
        when a scheduled access trigger frame is not scheduled during the beacon interval beginning with the next beacon, determine whether, one of, a first weighted average calculated as a function of buffer status reports is greater than a first threshold, or a second weighted average calculated as a function of users sending single user uplink traffic is greater than the first threshold;

when either the first weighted average or the second weighted average is greater than the first threshold, allocate a predetermined number of random access resource units along with at least one scheduled access resource unit in a buffer status report poll trigger frame and schedule the buffer status report poll trigger frame for transmission; and wirelessly transmit the buffer status report poll trigger frame with the predetermined number of random access resource units and the at least one scheduled access resource unit to clients in the wireless local area network.

12. The device of claim 11, wherein the first threshold is greater than or equal to a ratio of overhead apportioned to multi-user clients ($OH_{MU}$) and single-user clients ($OH_{SU}$).

13. The device of claim 12, wherein the overhead apportioned to multi-user clients comprises: $AIFS+BO+T_{BSR\text{-}TF}+SIFS+T_{BSR}+SIFS+T_{TF}+SIFS+T_{MU\_Pream}+SIFS+T_{MBA}$, where, AIFS is Arbitration inter-frame spacing, BO is backoff interval, $T_{BSR\text{-}TF}$ is Avg. time taken to transmit RA-BSRP TF, SIFS is short interframe space, $T_{BSR}$ is Avg. time taken to transmit BSR by clients, $T_{TF}$ is Avg. time taken to transmit basic TF, $T_{MU\_Pream}$ is Avg. time taken to transmit high efficiency (HE) MU-OFDMA preamble, and $T_{MBA}$ is Avg. time taken to transmit multi station block acknowledgment (Multi-STA BA).

14. The device of claim 12, wherein the overhead apportioned to single-user clients comprises: $AIFS+BO+T_{SU\_Pream}+SIFS+T_{BA}$, where, AIFS is Arbitration inter-frame spacing, BO is backoff interval, $T_{SU\_Pream}$ is Avg. time taken to transmit high efficiency singer user (HE SU) preamble, SIFS is short interframe space, and $T_{BA}$ is Avg. time taken to transmit BA.

15. The device of claim 11, wherein the one or more processors are further configured to confirm that a response to the buffer status report poll trigger frame, in a form of a buffer status report, has been received, and in response to confirming that a response to the buffer status report poll trigger frame has been received, schedule a scheduled access trigger frame to gather uplink data from clients in the wireless local area network.

16. The device of claim 11, wherein the at least one scheduled access resource unit in the buffer status report poll trigger frame is used to detect collisions with a random access buffer status report poll trigger frame transmission.

17. The device of claim 11, wherein the one or more processors are further configured to determine whether a number of clients whose respective buffer status reports collided with one another ($N_{COL}$) is greater than a second threshold, and when $N_{COL}$ is greater than the second threshold, schedule one of another buffer status report poll trigger frame to collect uplink data from previously collided users.

18. A non-transitory computer readable storage media encoded with instructions that, when executed by a processor, cause the processor to:

determine whether a next beacon to be sent by an access point in a wireless local area network includes a delivery traffic indication map;

when the next beacon to be sent by the access point does not include a delivery traffic indication map, determine whether a scheduled access trigger frame is scheduled during a beacon interval beginning with the next beacon;

when a scheduled access trigger frame is not scheduled during the beacon interval beginning with the next beacon, determine whether, one of, a first weighted average calculated as a function of buffer status reports is greater than a first threshold, or a second weighted average calculated as a function of users sending single user uplink traffic is greater than the first threshold;

when the first weighted average is greater than the first threshold, allocate a predetermined number of random access resource units along with at least one scheduled access resource unit in a buffer status report poll trigger frame and schedule the buffer status report poll trigger frame for transmission; and wirelessly transmit the buffer status report poll trigger frame with the predetermined number of random access resource units and the at least one scheduled access resource unit to clients in the wireless local area network.

19. The non-transitory computer readable storage media of claim 18, wherein the first threshold is greater than or equal to a ratio of overhead apportioned to multi-user clients ($OH_{MU}$) and single-user clients ($OH_{US}$).

20. The non-transitory computer readable storage media of claim 19, wherein the overhead apportioned to multi-user clients comprises: $AIFS+BO+T_{BSR\text{-}TF}+SIFS+T_{BSR}+SIFS+T_{TF}+SIFS+T_{MU\_Pream}+SIFS+T_{MBA}$, where, AIFS is Arbitration inter-frame spacing, BO is backoff interval, $T_{BSR\text{-}TF}$ is Avg. time taken to transmit RA-BSRP TF, SIFS is short interframe space, $T_{BSR}$ is Avg. time taken to transmit BSR by clients, $T_{TF}$ is Avg. time taken to transmit basic TF, $T_{MU\_Pream}$ is Avg. time taken to transmit high efficiency (HE) MU-OFDMA preamble, and $T_{MBA}$ is Avg. time taken to transmit multi station block acknowledgment (Multi-STA BA).

* * * * *